(12) United States Patent
Mizushima (10) Patent No.: US 7,244,532 B2
(45) Date of Patent: Jul. 17, 2007

(54) HOLOGRAPHIC RECORDING MEDIUM

(75) Inventor: Tetsuro Mizushima, Chuo-ku (JP)

(73) Assignee: TDK Corporation, Tokyo (JP)

( * ) Notice: Subject to any disclaimer, the term of this patent is extended or adjusted under 35 U.S.C. 154(b) by 491 days.

(21) Appl. No.: 10/676,747

(22) Filed: Oct. 1, 2003

(65) Prior Publication Data
US 2004/0067419 A1    Apr. 8, 2004

(30) Foreign Application Priority Data
Oct. 7, 2002    (JP)    ............................. 2002-293584

(51) Int. Cl.
*G03H 1/04* (2006.01)
(52) U.S. Cl. .................... 430/1; 430/2; 359/22; 359/25
(58) Field of Classification Search ................... None
See application file for complete search history.

(56) References Cited

U.S. PATENT DOCUMENTS

| | | | | |
|---|---|---|---|---|
| 1,305,195 | A | * | 5/1919 | Cocanari .................... 430/510 |
| 3,833,383 | A | * | 9/1974 | Ryan et al. .................... 430/2 |
| 4,367,911 | A | * | 1/1983 | Graube .......................... 359/3 |
| 5,633,100 | A | * | 5/1997 | Mickish et al. ................ 430/1 |
| 6,329,104 | B1 | * | 12/2001 | Clube et al. .................. 430/1 |
| 2002/0114027 | A1 | * | 8/2002 | Horimai ........................ 359/11 |

FOREIGN PATENT DOCUMENTS

| JP | 60-112003 | * | 6/1985 |
|---|---|---|---|
| JP | 01-040878 | * | 2/1989 |
| JP | 01-231082 | * | 9/1989 |
| JP | 02-113287 | * | 4/1990 |
| JP | 05-203812 | * | 8/1993 |
| JP | 05-281883 | * | 10/1993 |
| JP | 07-281583 | * | 10/1995 |
| JP | 08-286594 | * | 11/1996 |
| JP | 09-034015 | * | 2/1997 |
| JP | 63-291082 | * | 11/1998 |
| JP | 2001-006215 | * | 1/2001 |
| JP | 2002-063733 | | 2/2002 |

OTHER PUBLICATIONS

Machine translation of JP 2002-063733.*

* cited by examiner

*Primary Examiner*—Martin Angebranndt
(74) *Attorney, Agent, or Firm*—Seed IP Law Group PLLC

(57) ABSTRACT

A holographic recording medium includes a holographic recording carrier including a first light transmittable substrate, a second light transmittable substrate and a holographic recording layer sandwiched therebetween, a first antireflection film formed on the surface of the first light transmittable substrate and a second antireflection film formed on the surface of the second light transmittable substrate, and optical characteristics of the first antireflection film and those of the second antireflection film are determined to be different from each other the thus constituted holographic recording medium can achieves improved data recording characteristics and data reproducing characteristics using an object beam and a reference beam, and concurrently enables desired positioning of an object beam and a reference beam, or only the reference beam, and detection of the address of the region in which data are being recorded or from which data are being reproduced using a position control beam.

17 Claims, 8 Drawing Sheets

HOLOGRAPHIC RECORDING MEDIUM

BACKGROUND OF THE INVENTION

The present invention relates to a holographic recording medium and, particularly, to a holographic recording medium in which data can be three-dimensionally recorded as a hologram.

DESCRIPTION OF THE PRIOR ART

Write-once type optical recording media such as the CD-R and DVD-R and data rewritable type optical recording media such as CD-RW and DVD-RW have been widely used as recording media for recording digital data. When data are to be recorded in one of these conventional optical recording media, a laser beam whose intensity is modulated is projected onto a recording layer of the optical recording medium, thereby chemically and/or physically changing the recording layer locally to form a recording mark. Data are constituted by the length (record mark length) between the front edge and the rear edge of the record mark and the length (blank length) between the rear edge of the record mark and the front edge of a next record mark. Therefore, in these optical recording media, data are one-dimensionally expressed and two-dimensionally recorded.

However, recent marked progress toward an advanced information society have created a need for further increases in the capacity of optical recording media and further acceleration of data recording and data reproducing. For satisfying these requirements, various types of next-generation optical recording media have been proposed. Among these, attention has focused on technology for accomplishing high capacity optical recording media and high speed data recording and data reproducing by recording image-like data in optical recording media instead of two-dimensionally recording data therein. One example of such technology is holographic recording. In holographic recording, image-like data are three-dimensionally recorded in optical recording media. Recording media in which data can be recorded by holographic recording are called holographic recording media ("Holographic Data Storage," Springer series in optical sciences 76).

In holographic recording, two coherent laser beams called an object beam and a reference beam are projected onto a recording layer (holographic recording layer) of a holographic recording medium at different angles, thereby generating interference fringes and the thus-generated interference fringes are three-dimensionally recorded in the recording layer as a hologram. When data are to be reproduced, a reference beam is projected onto the recording layer in which the interference fringes are recorded and data recorded as a hologram are reproduced.

As described in Japanese Patent Application Laid Open No. 2002-63733, the substrate of a holographic recording medium may be formed with a concavo-convex pattern used for positioning the object beam and the reference beam or the reference beam and detecting the address of a region in which data are being recorded or from which data are being reproduced. In such a case, when data are to be recorded or data are to be reproduced, it is possible to position the object beam and the reference beam or only the reference beam and detect the address of a region in which data are being recorded or from which data are being reproduced by focusing the spot of a third laser beam called a position control beam onto the concavo-convex pattern.

As pointed out above, since data are three-dimensionally recorded in the holographic recording medium, it can be considered that data recording and data reproducing are greatly affected by the reflection of the laser beams by the surface of the substrate, which causes no problem in the conventional optical recording media in which data are two-dimensionally recorded. For this reason, it is considered necessary in the holographic recording medium to suppress the reflection of the laser beams by the surface of the substrate, which affects data recording and data reproducing, by providing an antireflection film on the surface of the substrate.

However, if an antireflection film is provided on the surface of the substrate to greatly suppress the reflection of the laser beams by the surface of the substrate, the light reflected by the surface of the substrate when the position control beam is projected onto the concavo-convex pattern formed on the surface of the substrate is not modulated in a desired manner and, therefore, it becomes difficult to position the object beam and the reference beam or the reference beam, or detect the address of a region in which data are being recorded or from which data are being reproduced.

SUMMARY OF THE INVENTION

It is therefore an object of the present invention to provide a holographic recording medium that achieves improved data recording characteristics and data reproducing characteristics using an object beam and a reference beam and concurrently enables desired positioning of the object beam and the reference beam, or only the reference beam, and detection of the address of the region in which data are being recorded or from which data are being reproduced using a position control beam.

The above and other objects of the present invention can be accomplished by a holographic recording medium comprising a holographic recording carrier in which data can be holographically recorded, a first antireflection film formed on one surface of the holographic recording carrier and a second antireflection film formed on the other surface of the holographic recording carrier, optical characteristics of the first antireflection film and those of the second antireflection film being different from each other.

In the present invention, the holographic recording carrier as termed herein includes at least one holographic recording layer and it may be constituted by a pair of light transmittable substrates and a holographic recording layer sandwiched therebetween or a light transmittable substrate and a holographic recording layer formed on one surface of the light transmittable substrate. Further, the holographic recording carrier may be constituted by a holographic recording layer alone.

According to the present invention, since the first antireflection film and the second antireflection film have different optical characteristics from each other, it is possible to suppress the reflection of an object beam and a reference beam by the surface of the holographic recording carrier and ensure the reflection of a position control beam by the surface of the holographic recording carrier by properly setting the optical characteristics of the first antireflection film and those of the second antireflection film. It is therefore possible to improve data recording characteristics and data reproducing characteristics using an object beam and a reference beam and is concurrently possible to enable desired positioning of the object beam and the reference beam, or only the reference beam, and detection of the address of the region in which data are being recorded or from which data are being reproduced using a position control beam.

In a preferred aspect of the present invention, the holographic recording carrier is constituted so that data can be recorded therein and data can be reproduced therefrom by projecting a first laser beam, and a concavo-convex pattern is formed on the other surface of the holographic recording carrier so that the first laser beam can be positioned and an address of a region in which data are being recorded or from which data are being reproduced by projecting a second laser beam onto the concavo-convex pattern.

In a further preferred aspect of the present invention, the second antireflection film is formed so that the reflection coefficient thereof with respect to the second laser beam is higher than that with respect to the first laser beam thereof.

According to this preferred aspect of the present invention, it is possible to suppress the reflection of the first laser beam by the other surface of the holographic recording carrier and ensure the reflection of the second laser beam thereby.

In a further preferred aspect of the present invention, the first antireflection film and the second antireflection film are formed so that the reflection coefficient of the second antireflection film with respect to the second laser beam is higher than that of the first antireflection film with respect to the second laser beam.

According to this preferred aspect of the present invention, it is possible to suppress the reflection of the second laser beam by the one surface of the holographic recording carrier and ensure the reflection of the second laser beam by the other surface of the holographic recording carrier.

In the present invention, the reflection coefficient of the first antireflection film with respect to the first laser beam and the reflection coefficient of the second antireflection film with respect to the first laser beam are both preferably equal to or lower than 1.0% and more preferably equal to or lower than 0.5%.

When the reflection coefficient of the first antireflection film with respect to the first laser beam and the reflection coefficient of the second antireflection film with respect to the first laser beam are both equal to or lower than 1.0%, it is possible to effectively prevent the reflection of the first laser beam by both surfaces of the holographic recording carrier from affecting data recording and data reproducing.

Further, in the present invention, the reflection coefficient of the second antireflection film with respect to the second laser beam is preferably equal to or higher than 2.0%, more preferably equal to or higher than 3.0% and most preferably equal to or higher than 4.0%.

When the reflection coefficient of the second antireflection film with respect to the second laser beam is equal to or higher than 2.0%, the second laser beam reflected by the concavo-convex pattern can be greatly modulated.

Furthermore, in the present invention, it is preferable that the wavelength of the first laser beam is shorter than that of the second laser beam.

When the wavelength of the first laser beam is shorter than that of the second laser beam, it is possible to reliably prevent the holographic recording carrier from being exposed and data from being degraded and lost.

Moreover, the thickenesses of the first antireflection film and the second antireflection film are both preferably equal to or thinner than 1.5 times the wavelength of the first laser beam.

When the thickenesses of the first antireflection film and the second antireflection film are both equal to or thinner than 1.5 times the wavelength of the first laser beam, material cost thereof can be reduced and since time required for forming the first antireflection film and the second antireflection film can be shortened, manufacturing cost thereof can be reduced. Further, it is possible to prevent the first antireflection film and the second antireflection film from being peeled off due to stress generated therein.

In a preferred aspect of the present invention, the first antireflection film is formed on the surface of the holographic recording carrier onto which the first laser beam is to be projected.

In a preferred aspect of the present invention, the holographic recording carrier includes a first light transmittable substrate, a second light transmittable substrate and a holographic recording layer sandwiched therebetween.

The above and other objects and features of the present invention will become apparent from the following description made with reference to the accompanying drawings.

DESCRIPTION OF THE PREFERRED EMBODIMENTS

Figure 1:
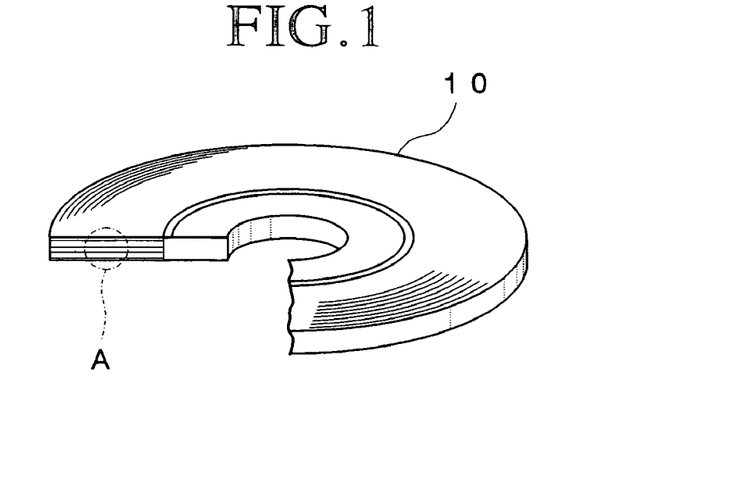
FIG. 1 is a schematic partially cutaway perspective view showing the appearance of a holographic recording medium that is a preferred embodiment of the present invention.
Figure 2:
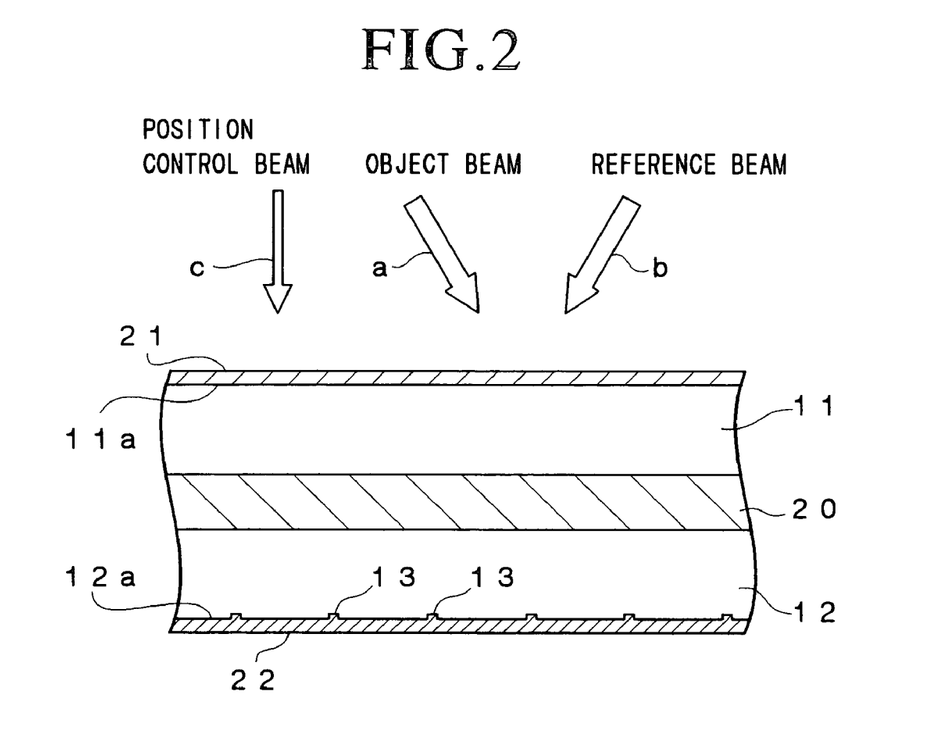
FIG. 2 is an enlarged schematic cross-sectional view of a section indicated by A in FIG. 1.

FIG. 1 is a schematic partially cutaway perspective view showing the appearance of a holographic recording medium that is a preferred embodiment of the present invention and FIG. 2 is an enlarged schematic cross-sectional view of a section indicated by A in FIG. 1.

As shown in FIG. 1, a holographic recording medium 10 according to this embodiment has a disk-like outer shape and the central portion thereof is formed with a hole.

The outer diameter and thickness of the holographic recording medium 10 are not particularly limited but are preferably identical or similar to those of current optical recording such as the CD and DVD, namely, 120 mm and 1.2 mm, for enabling it to be easily handled in a drive (holographic recording and reproducing apparatus).

As shown in FIG. 2, the holographic recording medium 10 includes light transmittable substrates 11, 12, a holographic recording layer 20 formed between the light transmittable substrates 11, 12, an antireflection film 21 formed on the surface 11*a* of the light transmittable substrate 11, and an antireflection film 22 formed on the surface 12*a* of the light transmittable substrate 12. An object beam a, a reference beam b and a position control beam care projected onto the antireflection film 21, thereby recording data therein or reproducing data therefrom.

As described later in detail, the object beam a and the reference beam b are emitted from the same laser beam source and their wavelengths are each defined as $\lambda 0$ in this specification.

The position control beam c is emitted from a laser beam source different from that for emitting the object beam a and the reference beam b and the wavelength thereof is defined as $\lambda 1$ in this specification where $\lambda 1 \neq \lambda 0$.

The wavelength $\lambda 0$ and the wavelength $\lambda 1$ preferably have such a relationship as $\lambda 0 < \lambda 1$ and more preferably have such a relationship as $1.2 \times \lambda 0 < \lambda 1 < 2.0 \times \lambda 0$.

If the wavelength $\lambda 0$ and the wavelength $\lambda 1$ are set so as to satisfy these relationships, it is possible to prevent the holographic recording layer 20 from being exposed to the position control beam c and data from being degraded or lost.

Further, in order to realize high capacity of the holographic recording medium and high speed data recording and data reproducing, it is preferable for the wavelength $\lambda 0$ to be set between 350 nm and 550 nm. Moreover, if the wavelength $\lambda 1$ is too long, the resolving power becomes poor, making it necessary to form the concavo-convex pattern described later large or deep. It is therefore preferable for the wavelength $\lambda 1$ to be smaller than double the wavelength $\lambda 0$.

The light transmittable substrates 11, 12 are disk-like substrates made of a material having a sufficiently high light transmittance at least at the wavelengths of $\lambda 0$ and $\lambda 1$. The light transmittable substrate 11 serves to transmit the object beam a, the reference beam b and the position control beam c, and the light transmittable substrate 12 serves to transmit the reference beam b. Further, the light transmittable substrates 11, 12 serve to physically and chemically protect the holographic recording layer 20 and serve as substrates for ensuring the mechanical strength required by the holographic recording medium 10. Therefore, the materials for forming the light transmittable substrates 11, 12 and the thicknesses thereof are determined based on these functions.

The light transmittable substrates 11, 12 can be formed of any of various materials. For example, glass, ceramic and resin can be used for forming the light transmittable substrates 11, 12 and it is preferable to employ resin or glass for forming the light transmittable substrates 11, 12. Illustrative examples of resins usable for forming the light transmittable substrates 11, 12 include polycarbonate resin, acrylic resin, epoxy resin, polystyrene resin, polyethylene resin, polypropylene resin, silicone resin, fluoropolymers, acrylonitrile butadiene styrene resin, urethane resin, polyolefin resin and the like. Among these, polyolefin resin is preferable and amorphous polyolefin resin is particularly preferable from the viewpoint of low double refraction. Illustrative examples of glass usable for forming the light transmittable substrates 11, 12 include soda lime glass, aluminosilicate glass, synthetic quartz glass and the like.

Further, it is preferable for the material for forming the light transmittable substrates 11, 12 to have substantially the same refractive index as that of the holographic recording layer 20 in order to prevent light from being reflected by the interfaces between the holographic recording layer 20 and themselves.

A concavo-convex pattern 13 is spirally formed on the surface 12*a* of the light transmittable substrate 12 from a portion in the vicinity of the center toward the outer circumference for positioning the object beam a and the reference beam b and identifying the address of the region in which data are being recorded or from which data are being reproduced.

As described later in detail, the position control beam c is projected onto the concavo-convex pattern 13 to form a beam spot thereon, and it is possible to position the object beam a and the reference beam b and detect the address at which data are being recorded or from which data are being reproduced by detecting light reflected from the concavo-convex pattern 13.

Therefore, the configuration of the concavo-convex pattern 13 is not particularly limited insofar as it enables the object beam a and the reference beam b to be positioned and the address to be detected, and the concavo-convex pattern 13 may be formed so as to be similar to the pattern of pit columns formed on the substrate of a CD-ROM or the like or may be formed so as to be similar to the pattern of a pre-groove formed on the substrate of a CD-R or the like.

In the case of forming the concavo-convex pattern 13 so as to be similar to the pattern of pit columns, it is possible for the length of the pits and the length between neighboring pits to carry address information, and in the case of forming the concavo-convex pattern 13 so as to be similar to the pattern of a pre-groove, it is possible for wobble of the pre-groove to carry address information.

The concavo-convex pattern 13 may be concentric and, in the case where the substrates 11, 12 have card-like shape or the like, it may be linear. It is not absolutely necessary for the concavo-convex pattern 13 to be continuously formed and the concavo-convex pattern 13 may be formed intermittently.

The holographic recording layer 20 is a layer onto which the coherent object beam a and reference beam b are projected and in which interference fringes generated by irradiation with the object beam a and reference beam b are recorded as a hologram.

The material for forming the holographic recording layer 20 is not particularly limited and a photosensitive material such as photopolymer can be used for forming the holographic recording layer 20.

Although the holographic recording layer 20 may be formed so as to be in direct contact with the light transmittable substrates 11, 12, a protective film may be interposed between the holographic recording layer 20 and the light transmittable substrates 11, 12 for preventing the holographic recording layer 20 from being degraded. In the case where a protective film is provided between the holographic recording layer 20 and the light transmittable substrates 11, 12, it is preferable for the protective film to have substantially the same refractive index as those of the light transmittable substrates 11, 12 and the holographic recording layer 20.

A laminate consisting of the light transmittable substrates 11, 12 and the holographic recording layer 20 will hereinafter be referred to as "a holographic recording carrier."

The antireflection films 21, 22 respectively serve to reduce the reflection of light by the surface 11*a* of the light transmittable substrate 11 and the surface 12*a* of the light transmittable substrate 12. The configurations of the antireflection films 21, 22 are not particularly limited but each is preferably constituted by a laminate including a plurality of inorganic films (an inorganic multi-layered film).

In this embodiment, the antireflection films 21, 22 are directly formed on the surface 11a of the light transmittable substrate 11 and the surface 12a of the light transmittable substrate 12, respectively. However, another layer may be interposed between the antireflection film 21 and the light transmittable substrate 11 or between the antireflection film 22 and the light transmittable substrate 12. Further, other layers may be interposed between the antireflection film 21 and the light transmittable substrate 11 and between the antireflection film 22 and the light transmittable substrate 12. In the case where another layer is provided between the light transmittable substrate 11, 12 and the antireflection film 21, 22, it is preferable for the other layer to have the substantially same refractive index as those of the light transmittable substrates 11, 12 and the holographic recording layer 20.

The optical characteristic of the antireflection film 21 and the optical characteristic of the antireflection film 22 are different from each other. Specifically, in the present invention, it is preferable for the reflection coefficient R21 ($\lambda 0$) of the antireflection film 21 with respect to a laser beam having the wavelength of $\lambda 0$, the reflection coefficient R21 ($\lambda 1$) of the antireflection film 21 with respect to a laser beam having the wavelength of $\lambda 1$, the reflection coefficient R22 ($\lambda 0$) of the antireflection film 22 with respect to a laser beam having the wavelength of $\lambda 0$ and the reflection coefficient R22 ($\lambda 1$) of the antireflection film 22 with respect to a laser beam having the wavelength of $\lambda 1$ to satisfy at least one of the following formulae (1) and (2) and more preferable for them to satisfy both of the formulae (1) and (2).

$$R22\ (\lambda 0) < R22\ (\lambda 1) \tag{1}$$

$$R21\ (\lambda 1) < R22\ (\lambda 1) \tag{2}$$

The antireflection film 21 and the antireflection film 22 of the holographic recording medium 10 according to this embodiment satisfy both of the formulae (1) and (2).

When the formula (1) is satisfied, since the reflection of the position control beam c by the surface 12a of the light transmittable substrate 12 can be ensured to some extent, while the reflection of the object beam a and the reference beam b by the surface 12a of the light transmittable substrate 12 can be suppressed, it is possible to suppress the adverse effect of the reflection of the object beam a and the reference beam b on data recording and data reproducing and to sufficiently modulate the position control beam c reflected by the concavo-convex pattern 13.

Further, when the formula (2) is satisfied, since the reflection of the position control beam c by the surface 12a of the light transmittable substrate 12 can be ensured to some extent, while the reflection of the position control beam c by the surface 11a of the light transmittable substrate 11 can be suppressed, it is possible to suppress the adverse effect of the reflection of the position control beam c on data recording and data reproducing and to sufficiently modulate the position control beam c reflected by the concavo-convex pattern 13.

Concretely, the reflection coefficient R21 ($\lambda 0$) of the antireflection film 21 with respect to a laser beam having the wavelength of $\lambda 0$ is preferably equal to or lower than 1.0% and more preferably equal to or lower than 0.5%. If the reflection coefficient R21 ($\lambda 0$) is set to be equal to or lower than 1.0%, it is possible to effectively prevent the reflection of the object beam a and the reference beam b by the surface 11a of the light transmittable substrate 11 from affecting data recording and data reproducing, and if the reflection coefficient R21 ($\lambda 0$) is set to be equal to or lower than 0.5%, it is possible to more effectively prevent the reflection of the object beam a and the reference beam b by the surface 11a of the light transmittable substrate 11 from affecting data recording and data reproducing.

As described later, since the object beam a and the reference beam b are projected onto the antireflection film 21 at predetermined angles, it is desirable for the reflection coefficient R21 ($\lambda 0$) to be within the above preferable ranges over as wide a range of incidence angles as possible, preferably over a range of 0 to 45 degrees, more preferably 0 to 55 degrees.

Further, the reflection coefficient R22 ($\lambda 0$) of the antireflection film 22 with respect to a laser beam having the wavelength of $\lambda 0$ is preferably equal to or lower than 1.0% and more preferably equal to or lower than 0.5%. If the reflection coefficient R22 ($\lambda 0$) is set to be equal to or lower than 1.0%, it is possible to effectively prevent the reflection of the object beam a and the reference beam b by the surface 12a of the light transmittable substrate 12 from affecting data recording and data reproducing, and if the reflection coefficient R22 ($\lambda 0$) is set to be equal to or lower than 0.5%, it is possible to more effectively prevent the reflection of the object beam a and the reference beam b by the surface 12a of the light transmittable substrate 12 from affecting data recording and data reproducing. Similarly to the reflection coefficient R21 ($\lambda 0$), it is desirable for the reflection coefficient R22 ($\lambda 0$) to be within the above preferable ranges over as wide a range of incidence angles as possible, preferably over a range of 0 to 45 degrees, more preferably 0 to 55 degrees.

Moreover, the reflection coefficient R21 ($\lambda 1$) of the antireflection film 21 with respect to a laser beam having the wavelength of $\lambda 1$ is preferably equal to or lower than 1.5% and more preferably equal to or lower than 1.0%. If the reflection coefficient R21 ($\lambda 1$) is set to be equal to or lower than 1.5%, it is possible to effectively prevent the reflection of the position control beam c by the surface 11a of the light transmittable substrate 11 from affecting data recording and data reproducing, and if the reflection coefficient R21 ($\lambda 1$) is set to be equal to or lower than 1.0%, it is possible to more effectively prevent the reflection of the position control beam c by the surface 11a of the light transmittable substrate 11 from affecting data recording and data reproducing. The upper limit of the preferable range of the reflection coefficient R21 ($\lambda 1$) can be determined to be higher than that of the reflection coefficient R21 ($\lambda 0$) because undesirable influence of the reflection of the object beam a and the reference beam b by the surface 11a of the light transmittable substrate 11 on data recording and data reproducing is greater than undesirable influence of the reflection of the position control beam c by the surface 11a of the light transmittable substrate 11 on data recording and data reproducing.

Further, the reflection coefficient R22 ($\lambda 1$) of the antireflection film 22 with respect to a laser beam having the wavelength of $\lambda 1$ is preferably equal to or higher than 2.0%, more preferably equal to or higher than 3.0% and most preferably equal to or higher than 4.0%. If the reflection coefficient R22 ($\lambda 1$) is set to be equal to or higher than 2.0%, it is possible to greatly modulate the position control beam c reflected by the concavo-convex pattern 13, and if the reflection coefficient R22 ($\lambda 1$) is set to be equal to or higher than 3.0%, it is possible to more greatly modulate the position control beam c reflected by the concavo-convex pattern 13. Further, if the reflection coefficient R22 ($\lambda 1$) is set to be equal to or higher than 4.0%, it is possible to markedly modulate the position control beam c reflected by the concavo-convex pattern 13.

As mentioned above, each of the antireflection films 21, 22 is preferably constituted by a laminate including a plurality of inorganic films (an inorganic multi-layered film). Illustrative examples of materials usable for forming the inorganic films include oxides such as $TiO_2$, $Y_2O_3$, $SiO_2$, $Al_2O_3$, $ZrO_2$, $CeO_2$, ZnO and the like, fluorides such as $MgF_2$, $AlF_3$ and the like, sulfides such as ZnS and the like, and mixtures thereof, and each of the antireflection films 21, 22 can be formed by laminating two or more kinds of inorganic films. The optical characteristic of each of the antireflection films 21, 22 can be adjusted by selecting the material used to form the individual inorganic films, the thickness of the individual inorganic films and the layer configuration. Therefore, antireflection films 21, 22 having the above optical characteristics can be formed by selecting the material used to form the individual inorganic films, the thickness of the individual inorganic films and the layer configuration.

Figure 3:
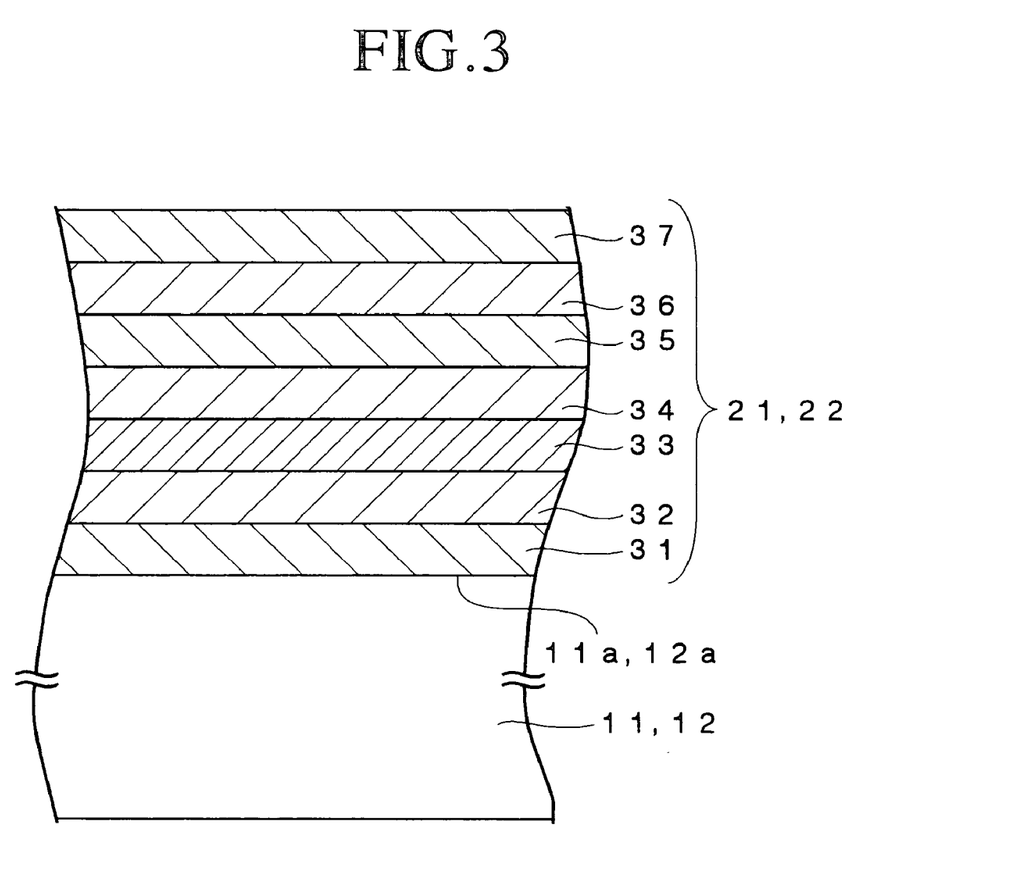
FIG. 3 is a schematic cross sectional view showing an antireflection film.

FIG. 3 is a schematic cross sectional view showing the antireflection films 21 (22).

The antireflection film 21 (22) shown in FIG. 3 includes seven inorganic films 31, 32, 33, 34, 35, 36, 37 laminated in this order. Among these inorganic films 31, 32, 33, 34, 35, 36, 37, the inorganic films 31, 35, 37 are formed of a material (hereinafter referred to as "a low refractive material") having a lower refractive index than those of the light transmittable substrates 11, 12, and the inorganic films 32, 34, 36 are formed of a material (hereinafter referred to as "a medium refractive material") having a slightly higher refractive index than those of the light transmittable substrates 11, 12. Further, the inorganic film 33 is formed of a material (hereinafter referred to as "a high refractive material") having a higher refractive index than that of the medium refractive material.

A refractive index as termed herein means a refractive index at the wavelength $\lambda 0$.

In the case where the light transmittable substrates 11, 12 have a refractive index of 1.47 to 1.60, a fluoride such as $MgF_2$, $AlF_3$ or the like, $SiO_2$ or a mixture thereof or a composition containing these as primary components can be used as the low refractive material and $Y_2O_3$, $Al_2O_3$, $ZrO_2$ or a mixture of ZnO and $SiO_2$ or a composition containing these as primary components can be used as the medium refractive material. Further, $TiO_2$, $CeO_2$ or a sulfide such as ZnS or the like or a composition containing these as primary components can be used as the high refractive material.

These inorganic films 31, 32, 33, 34, 35, 36, 37 can be formed using a sputtering process, a vapor deposition process, a sol-gel process or the like. From the viewpoint of control of the film thickness, it is particularly preferable to form them using a vapor deposition process or a sputtering process.

In this manner, antireflection films 21, 22 having an extremely low reflective coefficient over a wide incidence angle range at a specific wavelength can be formed by laminating the inorganic films 31, 35, 37 made of a low refractive material, the inorganic films 32, 34, 36 made of a medium refractive material and the inorganic film 33 made of a high refractive material so that the inorganic film 33 made of a high refractive material is interposed between the inorganic films 32, 34 made of a medium refractive material.

Therefore, in the case where each of the antireflection films 21, 22 has the configuration shown in FIG. 3, it is possible to form each of the antireflection films 21, 22 to have the above described optical characteristic by properly selecting the material for forming each of the inorganic films 31, 32, 33, 34, 35, 36, 37 and the thicknesses thereof.

The thickness of each of the antireflection films 21, 22 is preferably set to be equal to or thinner than $1.5 \times \lambda 0$. If the thickness of the antireflection films 21, 22 is set to be thicker than $1.5 \times \lambda 0$, the material cost increases, and since it takes a long time to form each of the antireflection films 21, 22, manufacturing cost increases. Further, since stress in the antireflection films 21, 22 increases, there is a risk of the antireflection films 21, 22 being peeled off.

Explanation will now be made as to a method for recording data in or reproducing data from the holographic recording medium 10 according to this embodiment.

Figure 4:
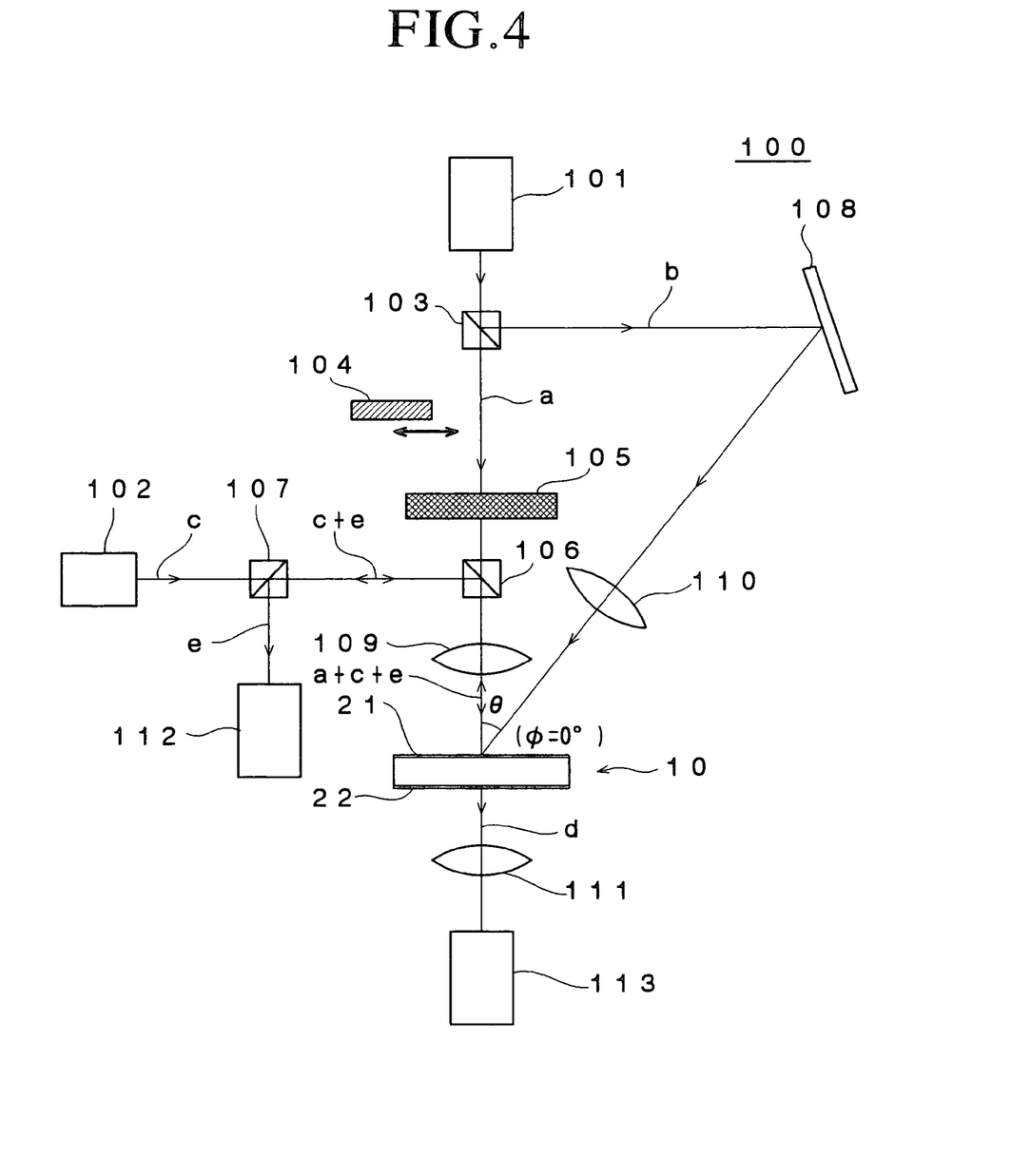
FIG. 4 is a diagram showing a hologram recording and reproducing apparatus for recording data in and reproducing data from a holographic recording medium.

FIG. 4 is a diagram showing a hologram recording and reproducing apparatus for recording data in and reproducing data from the holographic recording medium 10.

As shown in FIG. 4, the hologram recording and reproducing apparatus 100 includes a first laser beam source 101, a second laser beam source 102, a beam splitter 103, a shutter 104, a spatial light modulator 105, half mirrors 106, 107, a mirror 108, lenses 109, 110, 111, a position detector 112 and an image sensor 113.

The first laser beam source 101 is adapted for emitting a laser beam having a wavelength of $\lambda 0$ and the laser beam emitted from the first laser beam source 101 is split by the beam splitter 103 into an object beam a and a reference beam b.

On the other hand, the second laser beam source 102 is adapted for emitting a laser beam having a wavelength of $\lambda 1$ and the laser beam generated by the second laser beam source 102 is used as a position control beam c.

The shutter 104, the spatial light modulator 105, the half mirror 106 and the lens 109 are disposed in the optical path of the object beam a,. When data are to be recorded in the holographic recording medium 10, the object beam a is projected onto the holographic recording medium 10 so as to impinge perpendicularly on the surface of the antireflection film 21, namely, so that the incidence angle $\phi$ becomes zero.

When data are to be reproduced, the object beam a is blocked by the shutter 104. The object beam a is therefore projected onto the holographic recording medium 10 only when data are to be recorded. The spatial light modulator 105 provided in the optical path of the object beam a is adapted for two-dimensionally pattern modulating the object beam a in accordance with data to be recorded.

On the other hand, the reference beam b is reflected by the mirror 108 and projected via the lens 110 onto the surface of the antireflection film 21 of the holographic recording medium 10 at a predetermined incidence angle $\theta$. Since no shutter is provided in the optical path of the reference beam b, the holographic recording medium 10 is irradiated with the reference beam b both when data are to be recorded and when data are to be reproduced.

Therefore, when data are to be recorded, the holographic recording medium 10 is irradiated with the object beam a and the reference beam b, whereby interference fringes are generated in the holographic recording layer 20 by the object beam a and the reference beam b and recorded therein as a hologram.

On the other hand, when data are to be reproduced, the holographic recording medium 10 is irradiated with only the reference beam b, whereby the hologram formed in the holographic recording layer 20 is reproduced in the form of light and the thus-reproduced light including a hologram image is received by the image sensor 113 via the lens 111. The hologram image included in the reproduced light is converted to data by the image sensor 113.

The position control beam c passes through the half mirror 107 and is reflected by the half mirror 106 to advance along the same optical path as that of the object beam a. The position control beam c is focused onto the concavo-convex pattern 13 formed on the light transmittable substrate 12 and is reflected by the concavo-convex pattern 13 as a position control beam e that advances to the position detector 112, which uses it to detect the position of the object beam a and the reference beam b, or of only the reference beam b, and the address of the region in which data are being recorded or from which data are being reproduced.

More specifically, the position detector 112 first generates a focus signal based on the reflection of the position control beam c from the surface 12a of the light transmittable substrate 12 and generates a position signal based on the concavo-convex pattern 13. The focus signal and the position signal are fed to a drive means (not shown) and the drive means accurately moves the holographic recording medium 10 in the thickness direction thereof based on the focus signal and accurately moves the holographic recording medium 10 in the plane direction thereof based on the position signal. As a result, the object beam a and the reference beam b, or only the reference beam b, are accurately positioned. The object beam a and the reference beam b or the reference beam b may be positioned by moving the optical system including the mirrors, the lenses and the like as a whole instead of moving the holographic recording medium 10 using the drive means.

When data are to be recorded in the holographic recording medium 10 or data are to be reproduced therefrom using the thus constituted data recording and reproducing apparatus, since the reflection coefficient R22 ($\lambda 1$) of the antireflection film 22 with respect to the position control beam c having the wavelength of $\lambda 1$ is set to be considerably high, the intensity of the position control beam e reflected by the antireflection film 22 formed on the surface 12a of the light transmittable substrate 12 is considerably high and it is therefore possible to reliably position the objective beam a and the reference beam h and detect the address of the region in which data are being recorded or from which data are being reproduced by using the position detector 112 to detect the position control beam e reflected by the antireflection film 22.

Further, since the reflection coefficient R22 ($\lambda 0$) of the antireflection film 22 with respect to the object beam a and the reference beam b is set to be smaller than the reflection coefficient R22 ($\lambda 1$) thereof with respect to the position control beam c, the reflection of the object beam a and the reference beam b by the surface 12a of the light transmittable substrate 12 is suppressed and it is therefore possible to efficiently prevent the reflection of the object beam a and the reference beam b by the surface 12a of the light transmittable substrate 12 from affecting data recording or data reproducing.

Furthermore, in this embodiment, since the reflection coefficient R21 ($\lambda 1$) of the antireflection film 21 with respect to the position control beam c is set to be smaller than the reflection coefficient R22 ($\lambda 1$) of the antireflection film 22 with respect to the position control beam c, the reflection of the position control beam c by the surface 11a of the light transmittable substrate 11 is suppressed and it is therefore possible to efficiently prevent the reflection of the position control beam c by the surface 11a of the light transmittable substrate 11 from affecting data recording or data reproducing.

Figure 5:
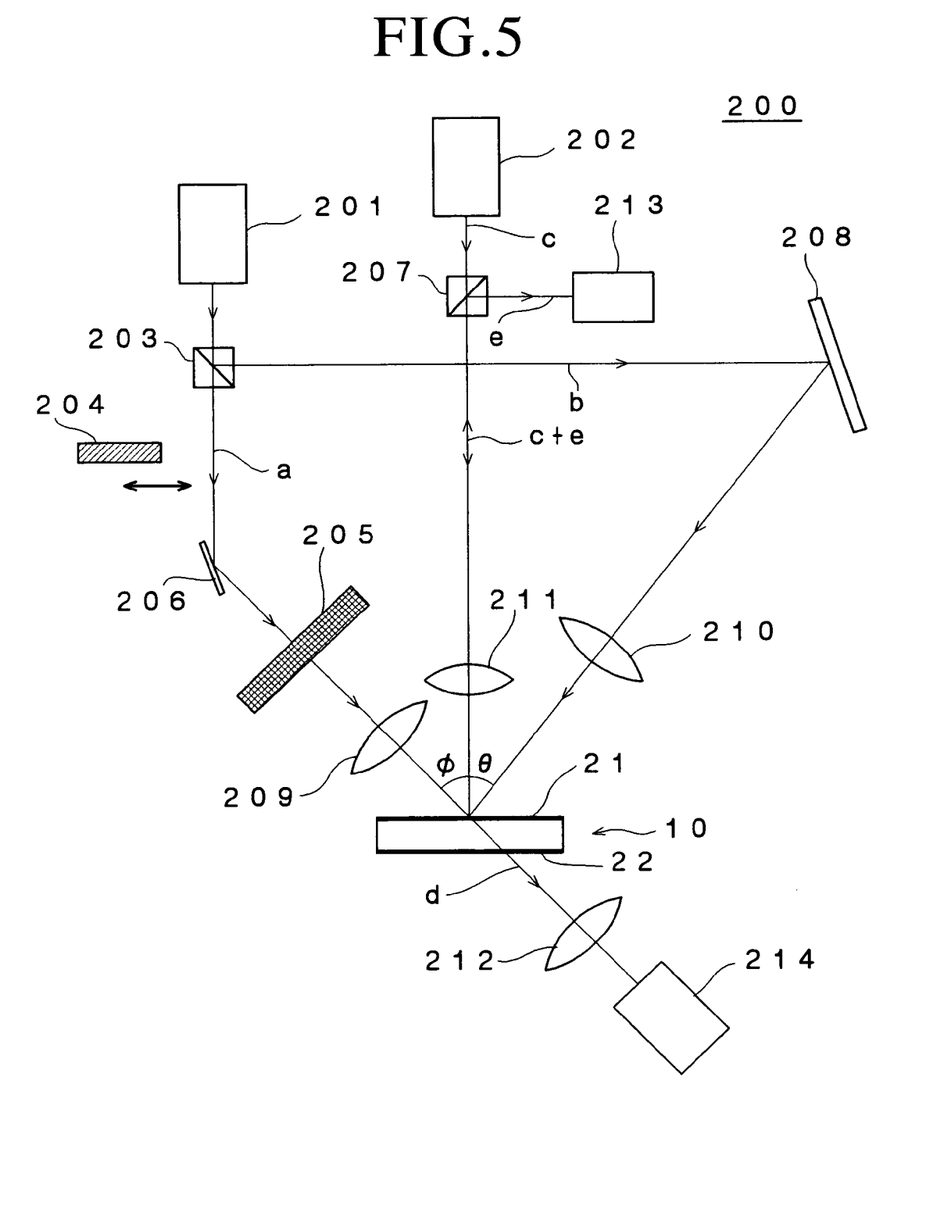
FIG. 5 is a diagram showing another example of a holographic data recording apparatus for recording data in and reproducing data from a holographic recording medium.

FIG. 5 is a diagram showing another example of a holographic data recording apparatus for recording data in and reproducing data from the holographic recording medium 10.

As shown in FIG. 5, the holographic data recording apparatus 200 includes a first laser beam source 201, a second laser beam source 202, a beam splitter 203, a shutter 204, a spatial light modulator 205, mirrors 206, 208, a half mirror 207, lenses 209, 210, 211, 212, a position detector 213 and an image sensor 214.

The first laser beam source 201 is adapted for emitting a laser beam having a wavelength of $\lambda 0$ and the laser beam emitted from the first laser beam source 201 is split by the beam splitter 203 into an object beam a and a reference beam b.

On the other hand, the second laser beam source 202 is adapted for emitting a laser beam having a wavelength of $\lambda 1$ and the laser beam generated by the second laser beam source 202 is used as a position control beam c.

The shutter 204, the mirror 206, the spatial light modulator 205 and the lens 209 are disposed in the optical path of the object beam a. When data are to be recorded in the holographic recording medium 10, the object beam a is projected onto the surface of the antireflection film 21 of the holographic recording medium 10 at a predetermined incidence angle $\phi$.

When data are to be reproduced, the object beam a is blocked by the shutter 204. The object beam a is therefore projected onto the holographic recording medium 10 only when data are to be recorded. The spatial light modulator 205 provided in the optical path of the object beam a is adapted for two-dimensionally pattern modulating the object beam a in accordance with data to be recorded.

On the other hand, the reference beam b is reflected by the mirror 208 and projected via the lens 210 onto the surface of the antireflection film 21 of the holographic recording medium 10 at a predetermined incidence angle $\theta$. Since no shutter is provided in the optical path of the reference beam b, the holographic recording medium 10 is irradiated with the reference beam b both when data are to be recorded and when data are to be reproduced.

Thus, when data are to be recorded, the holographic recording medium 10 is irradiated with the object beam a and the reference beam b, whereby interference fringes are generated by the object beam a and the reference beam b in the holographic recording layer 20 and recorded therein as a hologram.

On the other hand, when data are to be reproduced, the holographic recording medium 10 is irradiated with only the reference beam b, whereby the hologram formed in the holographic recording layer 20 is reproduced in the form of light and the thus-reproduced light including a hologram image is received by the image sensor 214 via the lens 212. The hologram image included in the reproduced light is converted to data by the image sensor 214.

The position control beam c passes through the half mirror 207 and is projected via the lens 211 onto the holographic recording medium 10 so as to impinge perpendicularly on the surface of the antireflection film 21.

The position control beam c is focused onto the concavo-convex pattern 13 formed on the light transmittable substrate 12 and is reflected by the concavo-convex pattern 13 as a position control beam e that advances to the position detector 213, which uses it to detect the position of the object beam a and the reference beam b, or only the reference beam b, and the address of the region in which data are being recorded or from which data are being reproduced.

When data are to be recorded in the holographic recording medium 10 or data are to be reproduced therefrom using the thus constituted data recording and reproducing apparatus, since the reflection coefficient R22 ($\lambda 1$) of the antireflection film 22 with respect to the position control beam c having the wavelength of λ1 is set to be considerably high, the intensity of the position control beam e reflected by the antireflection film 22 formed on the surface 12a of the light transmittable substrate 12 is considerably high and it is therefore possible to reliably position the objective beam a and the reference beam b and detect the address of the region where data are being recorded or data are being reproduced by using the position detector 213 to detect the position control beam e reflected by the antireflection film 22.

Further, since the reflection coefficient R22 (λ0) of the antireflection film 22 with respect to the object beam a and the reference beam b is set to be smaller than the reflection coefficient R22 (λ1) thereof with respect to the position control beam c, the reflection of the object beam a and the reference beam b by the surface 12a of the light transmittable substrate 12 is suppressed and it is therefore possible to efficiently prevent the reflection of the object beam a and the reference beam b by the surface 12a of the light transmittable substrate 12 from affecting data recording or data reproducing.

Furthermore, since the reflection coefficient R21 (λ1) of the antireflection film 21 with respect to the position control beam c is set to be smaller than the reflection coefficient R22 (λ1) of the antireflection film 22 with respect to the position control beam c, the reflection of the position control beam c by the surface 11a of the light transmittable substrate 11 is suppressed and it is therefore possible to efficiently prevent the reflection of the position control beam c by the surface 11a of the light transmittable substrate 11 from affecting data recording or data reproducing.

Generally, as the sum (φ+θ) of the incidence angle φ of the object beam a to the holographic recording medium 10 and the incidence angle θ of the reference beam b to the holographic recording medium 10, namely, the angle between the object beam a and the reference beam b, is close to 90 degrees, the multiplicity of the hologram becomes great and data can be recorded at high density.

Further, it is preferable for either the incidence angle φ of the object beam a to the holographic recording medium 10 or the incidence angle θ of the reference beam b to the holographic recording medium 10 to be close to 90 degrees for increasing diffraction efficiency.

Taking into consideration the layout of the optical system, the beam overlap volume of the object beam a and the reference beam b and other factors, it is preferable for realizing multiplex hologram recording and high density data recording that one or the other of the incidence angle φ of the object beam a to the holographic recording medium 10 and the incidence angle θ of the reference beam b to the holographic recording medium 10 be variable up to 45 degrees or more, more preferably up to 55 degrees or more.

In the case where a spherical wave is used as the object beam a and the reference beam b, it is preferable to use an object beam and a reference beam whose incidence angle to the holographic recording medium 10 can be varied up to 45 degrees or more, more preferably up to 55 degrees or more, for accomplishing high density data recording. Therefore, the reflection coefficient R21 (λ0) and the reflection coefficient R22 (λ0) are set low, preferably to be equal to or less than 1%, more preferably equal to or less than 0.5% over as wide a range of incidence angles as possible.

Further, in the case where the concavo-convex pattern 13 is located in the optical path of the object beam a, the reference beam b or the reproduced beam d, wavefront aberration is caused by the concavo-convex pattern 13 in the object beam a, the reference beam b or the reproduced beam d, whereby there arises a risk of generating noise in the recorded signal or reproduced signal. Therefore, it is preferable to project the object beam a and the reference beam b onto the holographic recording medium 10 so that the concavo-convex pattern 13 is not located in the optical path of the object beam a, the reference beam b or the reproduced beam d. In this embodiment, since the concavo-convex pattern 13 is formed on the light transmittable substrate 12 positioned opposite to the incidence direction of the object beam a and the reference beam b, only the positional relationship between the concavo-convex pattern 13 and the optical path of the reproduced beam d needs to be adjusted.

Since, as described above, the holographic recording medium 10 according to this embodiment includes the antireflection film 21 formed on the surface 11a of the light transmittable substrate 11 and the antireflection film 22 formed on the surface 12a of the light transmittable substrate 12 and the reflection coefficients of the antireflection film 21 and the antireflection film 22 are set so as to satisfy the above mentioned formulae (1) and (2), it is possible to improve the data recording characteristics and data reproducing characteristics using an object beam and a reference beam, and concurrently possible to enable desired positioning of the object beam a and reference beam b, or only the reference beam b, and detection of the address of the region in which data are being recorded or from which data are being reproduced using a position control beam c.

WORKING EXAMPLES

Working examples will now be set out in order to further clarify the advantages of the present invention.

Working Example 1

An amorphous polyolefin substrate having a thickness of 0.6 mm and a refractive index of 1.52 was prepared and an inorganic film having a thickness of 87 nm and a refractive index of 1.39 and made of a mixture of $MgF_2$ and $SiO_2$, an inorganic film having a thickness of 91 nm and a refractive index of 1.75 and made of $Y_2O_3$, an inorganic film having a thickness of 66 nm and a refractive index of 2.40 and made of $TiO_2$, an inorganic film having a thickness of 76 nm and a refractive index of 1.75 and made of $Y_2O_3$, an inorganic film having a thickness of 129 nm and a refractive index of 1.39 and made of a mixture of $MgF_2$ and $SiO_2$, an inorganic film having a thickness of 94 nm and a refractive index of 1.75 and made of $Y_2O_3$, and an inorganic film having a thickness of 110 nm and a refractive index of 1.39 and made of a mixture of $MgF_2$ and $SiO_2$ were formed in this order on the amorphous polyolefin substrate using a sputtering process, thereby fabricating a sample #1 provided with an antireflection film including a plurality inorganic films.

Further, another amorphous polyolefin substrate having a thickness of 0.6 mm and a refractive index of 1.52 was prepared and an inorganic film having a thickness of 118 nm and a refractive index of 1.39 and made of a mixture of $MgF_2$ and $SiO_2$, an inorganic film having a thickness of 101 nm and a refractive index of 1.75 and made of $Y_2O_3$, an inorganic film having a thickness of 46 nm and a refractive index of 2.40 and made of $TiO_2$, an inorganic film having a thickness of 108 nm and a refractive index of 1.75 and made of $Y_2O_3$, an inorganic film having a thickness of 86 nm and a refractive index of 1.39 and made of a mixture of $MgF_2$ and $SiO_2$, an inorganic film having a thickness of 112 nm and a refractive index of 1.75 and made of $Y_2O_3$, and an inorganic film having a thickness of 107 nm and a refractive index of 1.39 and made of a mixture of $MgF_2$ and $SiO_2$ were formed in this order on the amorphous polyolefin substrate using a sputtering process, thereby fabricating a sample #2 provided with an antireflection film including a plurality inorganic films.

Moreover, an amorphous polyolefin substrate having a thickness of 0.6 mm and a refractive index of 1.52 was prepared and an inorganic film having a thickness of 117 nm and a refractive index of 1.39 and made of a mixture of $MgF_2$ and $SiO_2$, an inorganic film having a thickness of 102 nm and a refractive index of 1.62 and made of $Al_2O_3$, an inorganic film having a thickness of 63 nm and a refractive index of 2.30 and made of ZnS, an inorganic film having a thickness of 72 nm and a refractive index of 1.85 and made of a mixture of $ZrO_2$ and $SiO_2$, an inorganic film having a thickness of 140 nm and a refractive index of 1.39 and made of a mixture of $MgF_2$ and $SiO_2$, an inorganic film having a thickness of 96 nm and a refractive index of 1.75 and made of $Y_2O_3$, and an inorganic film having a thickness of 106 nm and a refractive index of 1.39 and made of a mixture of $MgF_2$ and $SiO_2$ were formed in this order on the amorphous polyolefin substrate using a sputtering process, thereby fabricating a sample #3 provided with an antireflection film including a plurality inorganic films.

The above identified refractive indexes were measured with respect to double YAG laser having a wavelength λ of 532 nm. The antireflection films of the samples #1, #2 and #3 were 1.23 times the wavelength λ of the double YAG laser, 1.27 times the wavelength λ of the double YAG laser and 1.31 times the wavelength λ of the double YAG laser, respectively and were less than 1.5 times the wavelength λ of the double YAG laser.

A laser beam of wavelength λ was projected onto each of the samples #1, #2 and #3 and the reflection coefficients of the samples #1, #2 and #3 were measured. The wavelength λ was varied from 500 nm to 800 nm.

Figure 6:
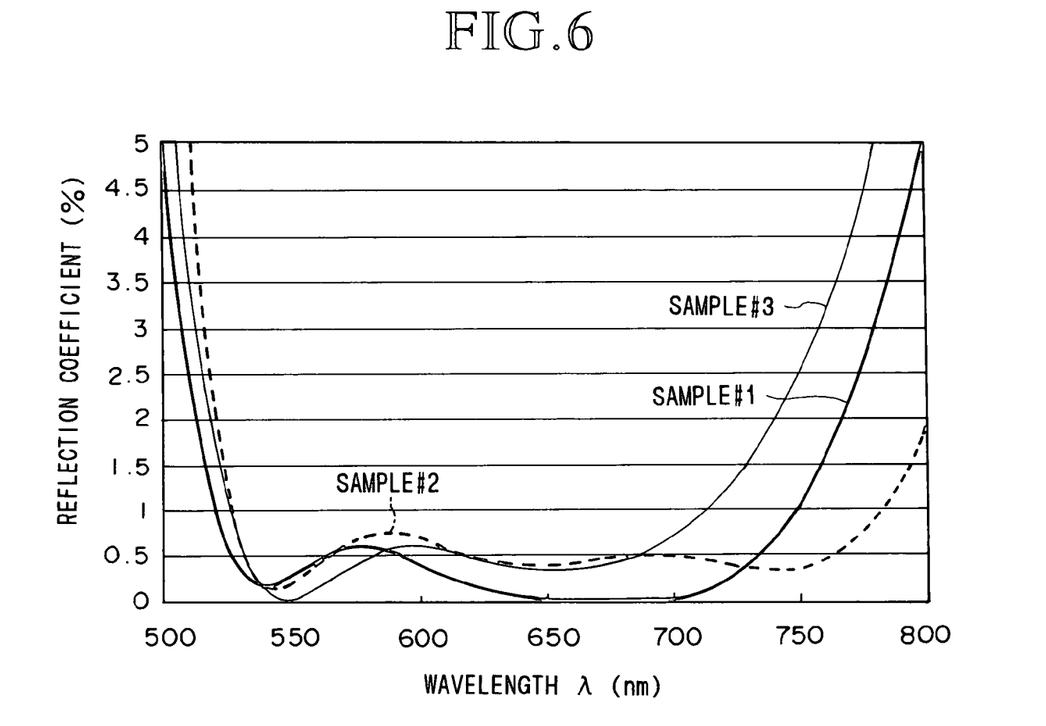
FIG. 6 is a graph showing the relationship between the reflection coefficients of samples #1, #2 and #3 and laser beam wavelength measured in working example 1.

The measurement results are shown in FIG. 6.

As shown in FIG. 6, the reflection coefficient at the wavelength λ in the vicinity of 530 nm was equal to or less than 0.5% in each of the samples #1, #2 and #3.

On the other hand, the reflection coefficients of the samples #1, #2 and #3 at a wavelength λ in the vicinity of 780 nm were about 3.1%, about 0.9% and about 5.0%, respectively.

Thus it was found that in the case where amorphous polyolefin having a refractive index of 1.52 was employed as the material for forming the light transmittable substrate, the antireflection film of the sample #2 was formed on the surface of the light transmittable substrate onto which the object beam, reference beam and position control beam were to be projected, the antireflection film of the sample #1 or #3 was formed on the surface of the other light transmittable substrate, the wavelength λ0 of the object beam and the reference beam was set to be about 530 nm and the wavelength λ1 of the position control beam was set to be about 780 nm, it was then possible to achieve improved data recording characteristics and data reproducing characteristics using the object beam and reference beam, concurrently possible to achieve desired positioning of the object beam a and the reference beam b, or only the reference beam b, and detection of the address of the region in which data were being recorded or from which data were being reproduced in a desired manner using the position control beam c.

It is possible, for example, to use a double YAG laser which emits a laser beam having a wavelength λ of 532 nm as the laser beam source for emitting the laser beam of wavelength λ0 and to use a CD infrared semiconductor laser that emits a laser beam having a wavelength λ of 780 nm as the laser beam source for emitting the laser beam of wavelength λ1.

Working Example 2

A sample #4 was fabricated in the manner of the sample #1 except that a soda lime glass substrate having a thickness of 0.6 mm and a refractive index of 1.52 was employed instead of the amorphous polyolefin substrate, and a sample #5 was fabricated in the manner of the sample #2 except that a soda lime glass substrate having a thickness of 0.6 mm and a refractive index of 1.52 was employed instead of the amorphous polyolefin substrate.

When the relationship between the reflection coefficients of the sample #4 and the sample #5 and the wavelength λ of a laser beam were measured, similar results to those for the sample #1 and the sample #2 were obtained.

Working Example 3

The reflection coefficients of the samples #1, #2 and #3 were measured by projecting a double YAG laser beam having a wavelength of 532 nm thereonto at various incidence angles.

Figure 7:
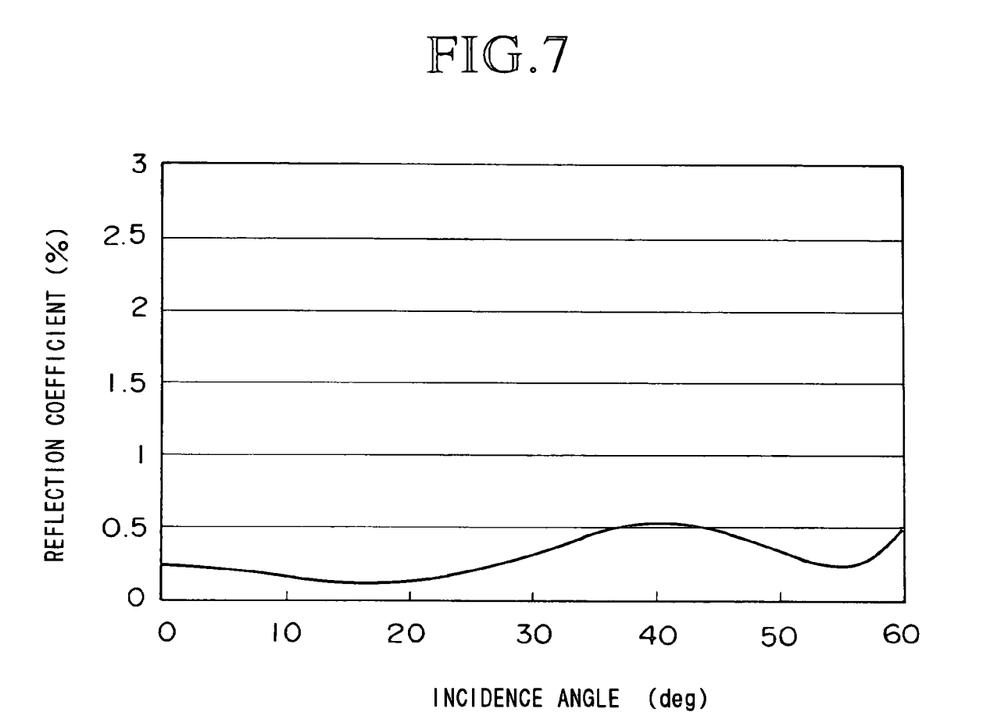
FIG. 7 is a graph showing the relationship between the reflection coefficient of a sample #1 and laser beam incidence angle measured in working example 3.
Figure 8:
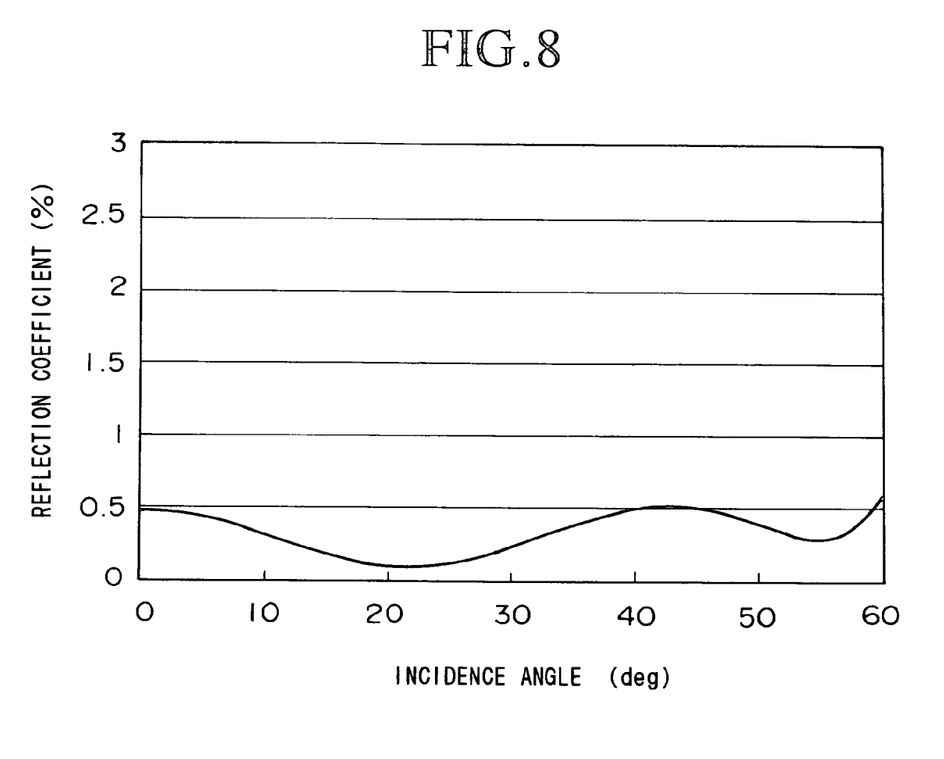
FIG. 8 is a graph showing the relationship between the reflection coefficient of a sample #2 and laser beam incidence angle measured in working example 3.
Figure 9:
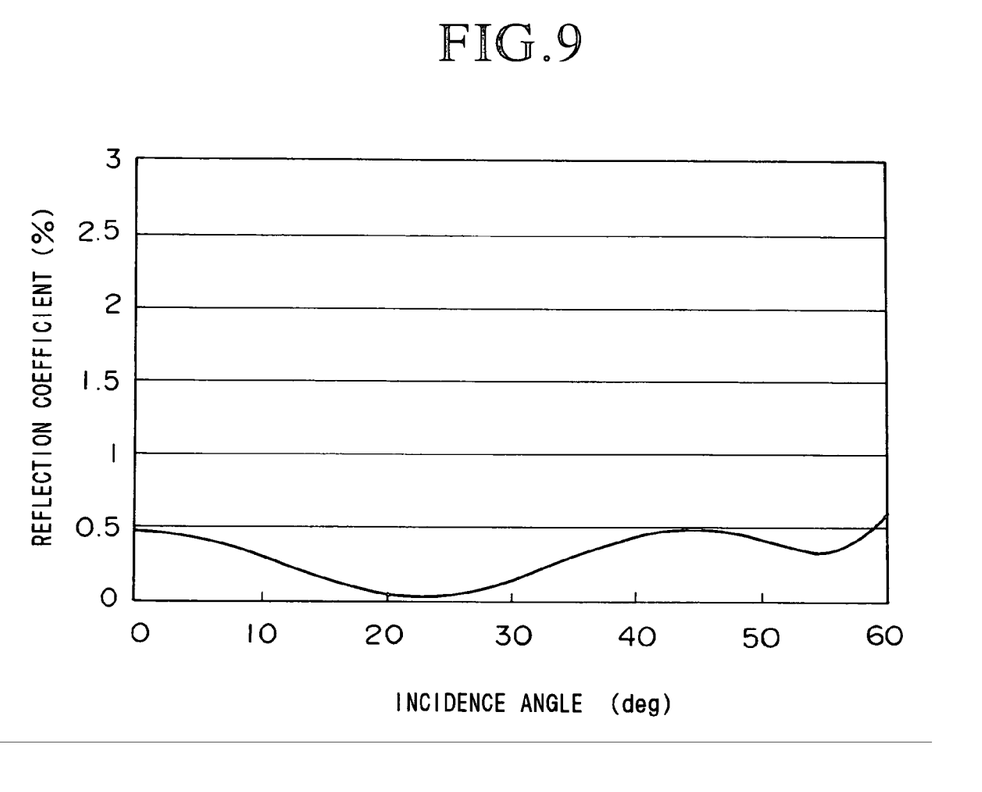
FIG. 9 is a graph showing the relationship between the reflection coefficient of a sample #3 and laser beam incidence angle measured in working example 3.

The measurement results for the sample #1, sample #2 and sample #3 are shown in FIGS. 7, 8 and 9, respectively.

As shown in FIGS. 7 to 9, it was found that even when the incidence angle of the laser beam was varied over a wide range from 0 to 60 degrees, the reflection coefficients of the samples #1, #2 and #3 remained substantially equal to or lower than 0.5% and did not exceed 1.0%.

Working Example 4

When the reflection coefficients of the samples #4 and #5 fabricated in working example 2 were measured in the manner of working example 3, similar results to those for the sample #1 and sample #2 were obtained.

The present invention has thus been shown and described with reference to specific embodiments and working examples. However, it should be noted that the present invention is in no way limited to the details of the described arrangements but changes and modifications may be made without departing from the scope of the appended claims.

For example, although in the above described embodiments the holographic recording carrier of the holographic recording medium 10 includes the light transmittable substrates 11, 12 and the holographic recording layer 20 sandwiched therebetween, it is not absolutely necessary for the holographic recording carrier to include the light transmittable substrates 11, 12 and the holographic recording layer 20 sandwiched therebetween and the holographic recording carrier may have a different layer configuration. For example, it is possible to constitute a holographic recording carrier of a single light transmittable substrate and a holographic recording layer and form antireflection films on the surfaces of the light transmittable substrate and the holographic recording layer. Moreover, if the holographic recording layer has sufficient mechanical strength, it is possible to constitute a holographic recording carrier of solely a holographic recording layer and form antireflection films on the both surfaces of the holographic recording layer.

Further, although in the above described embodiments the concavo-convex pattern 13 is formed on the light transmittable substrate 12 positioned opposite to the incidence direction of the object beam a and the reference beam b, it is not absolutely necessary for the concavo-convex pattern 13 to be formed on the light transmittable substrate 12 positioned opposite to the incidence direction of the object beam a and the reference beam b and it is possible to dispose the antireflection film 22 and the light transmittable substrate 12 formed with the concavo-convex pattern 13 so that the antireflection film 22 is located on the incidence side of the object beam a and the reference beam b, although it is necessary to form the concavo-convex pattern 13 so that it does not block the optical paths of the object beam a and the reference beam b and it is troublesome to design the concavo-convex pattern 13.

Furthermore, although in the holographic recording and reproducing apparatuses shown in FIGS. 4 and 5 the position control beam c is projected onto the concavo-convex pattern 13 from the side of the light transmittable substrate 11, it is not absolutely necessary for the position control beam c to be projected onto the concavo-convex pattern 13 from the side of the light transmittable substrate 11 and it is possible to project the position control beam c onto the concavo-convex pattern 13 from the side of the light transmittable substrate 12 and detect the position control beam c reflected from the concavo-convex pattern 13 to position the object beam a and the reference beam h and detect the address of the region in which data are being recorded or from which data are being reproduced.

Moreover, although in the above described embodiments the holographic recording medium 10 has a disk-like outer shape, it is not absolutely necessary for the holographic recording medium 10 to have a disk-like outer shape and the holographic recording medium 10 may have a card-like outer shape, a sheet-lie outer shape, a block-like outer shape or the like. Further, the holographic recording medium 10 may be constituted as built into a cartridge.

According to the present invention, it is possible to provide a holographic recording medium that achieves improved data recording characteristics and data reproducing characteristics using an object beam and a reference beam, and that concurrently enables desired positioning of an object beam and a reference beam, or only the reference beam, and detection of the address of the region in which data are being recorded or from which data are being reproduced using a position control beam.

The invention claimed is:

1. A holographic recording medium comprising a holographic recording carrier in which data can be holographically recorded, a first inorganic antireflection film formed on one surface of the holographic recording carrier and a second inorganic antireflection film formed on the other surface of the holographic recording carrier, optical characteristics of the first inorganic antireflection film and those of the second inorganic antireflection film being different from each other,
wherein the holographic recording carrier includes a first light transmittable substrate, a second light transmittable substrate and a holographic recording layer sandwiched therebetween, and
wherein the holographic recording carrier is constituted so that data can be recorded therein and data can be reproduced therefrom by projecting a first laser beam, and a concavo-convex pattern is formed on the second light transmittable substrate and covered by the second inorganic antireflection film so that the first laser beam can be positioned and an address of a region in which data are being recorded or from which data are being reproduced by projecting a second laser beam onto the concavo-convex pattern.

2. A holographic recording medium in accordance with claim 1, wherein the second inorganic antireflection film is formed so that a reflection coefficient thereof with respect to the second laser beam is higher than that with respect to the first laser beam thereof.

3. A holographic recording medium in accordance with claim 2, wherein the first inorganic antireflection film and the second inorganic antireflection film are formed so that the reflection coefficient of the second inorganic antireflection film with respect to the second laser beam is higher than that of the first inorganic antireflection film with respect to the second laser beam.

4. A holographic recording medium in accordance with claim 1, wherein the first inorganic antireflection film and the second inorganic antireflection film are formed so that the reflection coefficient of the second inorganic antireflection film with respect to the second laser beam is higher than that of the first inorganic antireflection film with respect to the second laser beam.

5. A holographic recording medium in accordance with claim 1, wherein the reflection coefficient of the first inorganic antireflection film with respect to the first laser beam and the reflection coefficient of the second inorganic antireflection film with respect to the first laser beam are both equal to or lower than 1.0%.

6. A holographic recording medium in accordance with claim 1, wherein the reflection coefficient of the second inorganic antireflection film with respect to the second laser beam is equal to or higher than 2.0%.

7. A holographic recording medium in accordance with claim 1, wherein a wavelength of the first laser beam is shorter than that of the second laser beam.

8. A holographic recording medium in accordance with claim 1, wherein thicknesses of the first inorganic antireflection film and the second inorganic antireflection film are both equal to or less than 1.5 times the wavelength of the first laser beam.

9. A holographic recording medium in accordance with claim 1, wherein the first inorganic antireflection film is formed on the surface of the holographic recording carrier onto which the first laser beam is to be projected.

10. A holographic recording medium comprising:
a holographic recording carrier in which data can be holographically recorded wherein the holographic recording carrier includes a first light transmittable substrate, a second light transmittable substrate and a holographic recording layer sandwiched therebetween;
a first inorganic antireflection film formed on one surface of the holographic recording carrier;
a second inorganic antireflection film formed on the other surface of the holographic recording carrier, reflection characteristics of the first inorganic antireflection film and those of the second inorganic antireflection film being different from each other, the holographic recording carrier being constituted so that data can be recorded therein and data can be reproduced therefrom by projecting a first laser beam; and
a concavo-convex pattern formed on the second light transmittable substrate and covered by the second inorganic antireflection film so that the first laser beam can be positioned and an address of a region in which data are being recorded or from which data are being reproduced can be detected by projecting a second laser beam whose wavelength is longer than that of the first laser beam onto the concavo-convex pattern, the second inorganic antireflection film being formed so that a reflection coefficient thereof with respect to the second laser beam is higher than that with respect to the first laser beam thereof.

11. The holographic recording medium of claim 10 wherein the first inorganic antireflection film and the second inorganic antireflection film are formed so that the reflection coefficient of the second inorganic antireflection film with respect to the second laser beam is higher than that of the first inorganic antireflection film with respect to the second laser beam.

12. The holographic recording medium of claim 11 wherein the reflection coefficient of the first inorganic antireflection film with respect to the first laser beam and the reflection coefficient of the second inorganic antireflection film with respect to the first laser beam are both equal to or lower than 1.0%.

13. The holographic recording medium of claim 12 wherein the reflection coefficient of the second inorganic antireflection film with respect to the second laser beam is equal to or higher than 2.0%.

14. The holographic recording medium of claim 11 wherein thicknesses of the first inorganic antireflection film and the second inorganic antireflection film are both equal to or less than 1.5 times the wavelength of the first laser beam.

15. The holographic recording medium of claim 10 wherein the reflection coefficient of the first inorganic antireflection film with respect to the first laser beam and the reflection coefficient of the second inorganic antireflection film with respect to the first laser beam are both equal to or lower than 1.0%.

16. The holographic recording medium of claim 15 wherein the reflection coefficient of the second inorganic antireflection film with respect to the second laser beam is equal to or higher than 2.0%.

17. The holographic recording medium of claim 10 wherein thicknesses of the first inorganic antireflection film and the second inorganic antireflection film are both equal to or less than 1.5 times the wavelength of the first laser beam.

* * * * *